United States Patent [19]
DeFilippi et al.

[11] Patent Number: 5,503,738
[45] Date of Patent: Apr. 2, 1996

[54] APPARATUS FOR BIOLOGICAL REMEDIATION OF VAPOROUS POLLUTANTS

[75] Inventors: Louis J. DeFilippi, Palatine; Francis S. Lupton, Evanston, both of Ill.; Mansour Mashayekhi, Huntington, W. Va.

[73] Assignee: AlliedSignal Inc., Morris Township, Morris County, N.J.

[21] Appl. No.: 300,506

[22] Filed: Sep. 2, 1994

Related U.S. Application Data

[62] Division of Ser. No. 48,993, Apr. 16, 1993, Pat. No. 5,413,714.

[51] Int. Cl.$^6$ .............................. B01D 53/14; C02F 3/10
[52] U.S. Cl. .............................. 210/150; 96/153; 435/266
[58] Field of Search .................... 210/616, 617, 210/150, 151, 615, 618, 908, 904; 95/149, 154, 155, 210, 211, 230, 237–240, 241, 900, 901; 96/150, 153; 435/266

[56] References Cited

U.S. PATENT DOCUMENTS

| | | | |
|---|---|---|---|
| 3,216,905 | 11/1965 | Baptist | 195/2 |
| 3,617,731 | 11/1971 | Schlicht | 208/263 |
| 4,045,609 | 8/1977 | Hart | 428/253 |
| 4,046,939 | 9/1977 | Hart | 428/311 |
| 4,225,381 | 9/1980 | Ishkawa et al. | 162/51 |
| 4,469,600 | 9/1984 | Frydman et al. | 210/610 |
| 4,479,876 | 10/1984 | Fuchs | 210/605 |
| 4,544,381 | 10/1985 | Schmidt | 55/89 |
| 4,566,971 | 1/1986 | Reimann et al. | 210/616 |
| 4,576,718 | 3/1986 | Reischl et al. | 210/606 |
| 4,662,900 | 5/1987 | Ottengraf | 55/90 |
| 4,681,851 | 7/1987 | Baumgarten et al. | 435/262 |
| 4,820,415 | 4/1989 | Reischl | 210/616 |
| 4,894,162 | 1/1990 | Cournoyer et al. | 210/603 |
| 4,999,302 | 3/1991 | Kahler et al. | 435/266 |
| 5,037,551 | 8/1991 | Barkley et al. | 210/603 |
| 5,066,392 | 11/1991 | Kneer | 210/96.1 |
| 5,080,793 | 1/1992 | Urlings | 210/603 |
| 5,106,496 | 4/1992 | Cournoyer et al. | 210/188 |
| 5,217,616 | 6/1993 | Sanyal et al. | 210/617 |

FOREIGN PATENT DOCUMENTS

| | | |
|---|---|---|
| 0100024 | 2/1984 | Germany . |
| 0121851 | 10/1984 | Germany . |
| 3428798 | 8/1985 | Germany . |
| 3423285 | 1/1986 | Germany . |
| 0240929 | 10/1987 | Germany . |
| 4032234 | 4/1992 | Germany . |
| 4104380A1 | 8/1992 | Germany . |
| 0497214 | 8/1992 | Germany . |
| 4104626A1 | 10/1992 | Germany . |

OTHER PUBLICATIONS

Environ, Sc. Technol., vol. 24, No. 10, 1990, "Technology".
Kirchner et al., "Purification of exhaust air containing organic pollutants in a trickle–bed bioreactor" Appl. Microbiol. biotechnol (1991) 35:396–400.
Bayer AG, Germany "Bioscrubber/ Trickling filter".
J. Robert Connor, "Case Study of Soil Venting", Jul. 1988, Pollution Engineering 20, #7, pp. 74–78.
Hasegawa, Susumu, "Practical Examples of Malodor Removal by the Utilization of Adsorption Material at Which Microorganisms are Immobilized" PPM 1992, 23(8), 30–34 (Japan).
Chemical Engineering, "Biofiltration System Removes Oders and Pollutants" Feb., 1990, p. 23.
Waste Treatment Technology News, "Biofilter Successfully Demonstrated" vol. 8, No. 3, Jan., 1993.

Primary Examiner—Thomas Wyse
Attorney, Agent, or Firm—Mary Jo Boldingh; Harold N. Wells; Roger H. Criss

[57] ABSTRACT

This invention relates to a process for remediating vaporous pollutants which comprises passing a vaporous stream containing one or more of pollutants through a bioreactor, the bioreactor comprising a plurality of biologically active bodies, the biologically active body comprising a macroporous substrate and one or more of microorganisms capable of remediating one or more of said pollutants, wherein the substrate is fabricated from a decomposition-resistant material. The present invention further provides an apparatus for this process.

9 Claims, 6 Drawing Sheets

APPARATUS FOR BIOLOGICAL REMEDIATION OF VAPOROUS POLLUTANTS

This application is a division, of application Ser. No. 08/048,993, filed Apr. 16, 1993, now U.S. Pat. No. 5,413,714.

BACKGROUND OF THE INVENTION

1. Field of the Invention

The present invention relates to a process for remediating vaporous pollutants. More particularly, the present invention relates to a process for remediating vaporous pollutants using a carbon-coated substrate that supports pollutant-remediating microorganisms.

2. Description of the Prior Art

There are three common ways to remove vaporous or gaseous pollutants from gas- or air-streams. One common method is to pass contaminated gases over an absorbent, such as activated carbon particles, which absorbs the pollutants contained in the gases. However, this type of removal requires a large volume of absorbents and creates the problem of disposal or regeneration of the spent absorbents.

The second common method is to pass contaminated gases through a biologically activated sludge that contains microorganisms which can metabolize and remediate the pollutants. This type of bioremediation processes are disclosed, for example, in U.S. Pat. Nos. 4,544,381 and 4,894,162. These processes also have disadvantages in that they create a large volume of sludge that needs to be disposed of and the rate of remediation is limited by the solubility of the pollutants in the sludge.

The other common method is to pass contaminated gases through a bed of substrates in a bioreactor which carries microorganisms that degrade the pollutants contained in the gases. The prior art substrates used in this method have mainly been decomposable organic matters, such as peat, wood chips and other composts. For example, U.S. Pat. No. 4,662,900 discloses a variation of this substrate method. However, the use of decomposable organic matters as the substrates for supporting and carrying the bioremediating microorganisms may be disadvantageous in that the substrates decompose and settle with time. In addition, the organic substrates are not dimensionally stable, changing their dimension with the age of the substrate and the humidity level in the bioreactor. Such settlement and dimensional instability change the flow pattern of the gases fed through the bioreactor, creating undesirable flow patterns, and often create channeling that directs the influent gases to bypass substantial sections of the bioreactor, diminishing the efficiency of the reactor. In addition, the organic substrates do not have appropriate configurations to allow the gases to pass through without a substantial pressure drop, and the organic substrates tend to get clogged as the biomass density increases in the reactor. Therefore, the prior art bioreactors require a high inflow pressure feed the contaminated gases.

Therefore it would be desirable to provide a bioreactor for remediating vaporous or gaseous pollutants that is highly efficient and does not diminish in efficiency during its operation.

SUMMARY OF THE INVENTION

The present invention provides a process for remediating vaporous pollutants which comprises passing a vaporous stream containing one or more of pollutants through a bioreactor, the bioreactor comprising a plurality of biologically active bodies, the biologically active body comprising a macroporous substrate and one or more of microorganisms capable of remediating one or more of said pollutants, wherein the substrate is fabricated from a decomposition-resistant material. In addition, the bioreactor further comprises a feeding means that supplies a solution of nutrients and buffers.

The present invention further provides a process for remediating vaporous pollutants which comprises passing a vaporous stream containing one or more of pollutants through a bioreactor, the bioreactor comprising a plurality of biologically active bodies and a plurality of open space bodies, the biologically active body comprising a macroporous substrate and one or more of microorganisms capable of remediating one or more of said pollutants, wherein said substrate is fabricated from a decomposition-resistant material.

Additionally, the present invention provides an apparatus for purification of a gaseous stream containing one or more pollutants by biodegradation with one or more microorganisms capable of metabolizing one or more of said pollutants, said apparatus comprising: a reactor having an inlet for inflow of the gaseous stream, the reactor comprising a plurality of biologically active bodies which comprise macroporous substrates and one or more of microorganisms capable of remediating one or more of the pollutants; an outlet for outflow of an effluent gas-stream in which the concentration of at least one of the pollutants is less than the concentration of the gaseous stream at the inlet; and a means to supply a solution of nutrients and buffers, wherein the porous substrates are fabricated from a decomposition-resistant material. The reactor may further comprises a plurality of open space bodies.

BRIEF DESCRIPTION OF THE FIGURE

The invention will be more fully understood and further advantages will become apparent when reference is made to the following description of the invention and the accompanying drawings in which.

DETAILED DESCRIPTION OF THE INVENTION

In accordance with the present invention, there is provided a process for remediating vaporous pollutants which comprises passing a vaporous-stream, having one or more of pollutants, through a bioreactor which comprises a plurality of biologically active bodies. The biologically active body comprises a macroporous substrate, and one or more of microorganisms that are capable of metabolizing at least one of the pollutants contained in the vaporous-stream. The bioreactor may further comprise open or substantially open space bodies (open space bodies) that are intermixed with the biologically active bodies. In the preferred embodiments of the present invention, the porous substrate or the porous substrate and the open space body are coated with an absorbent that is capable of absorbing one or more of the pollutants contained in the influent stream.

Figure 1:
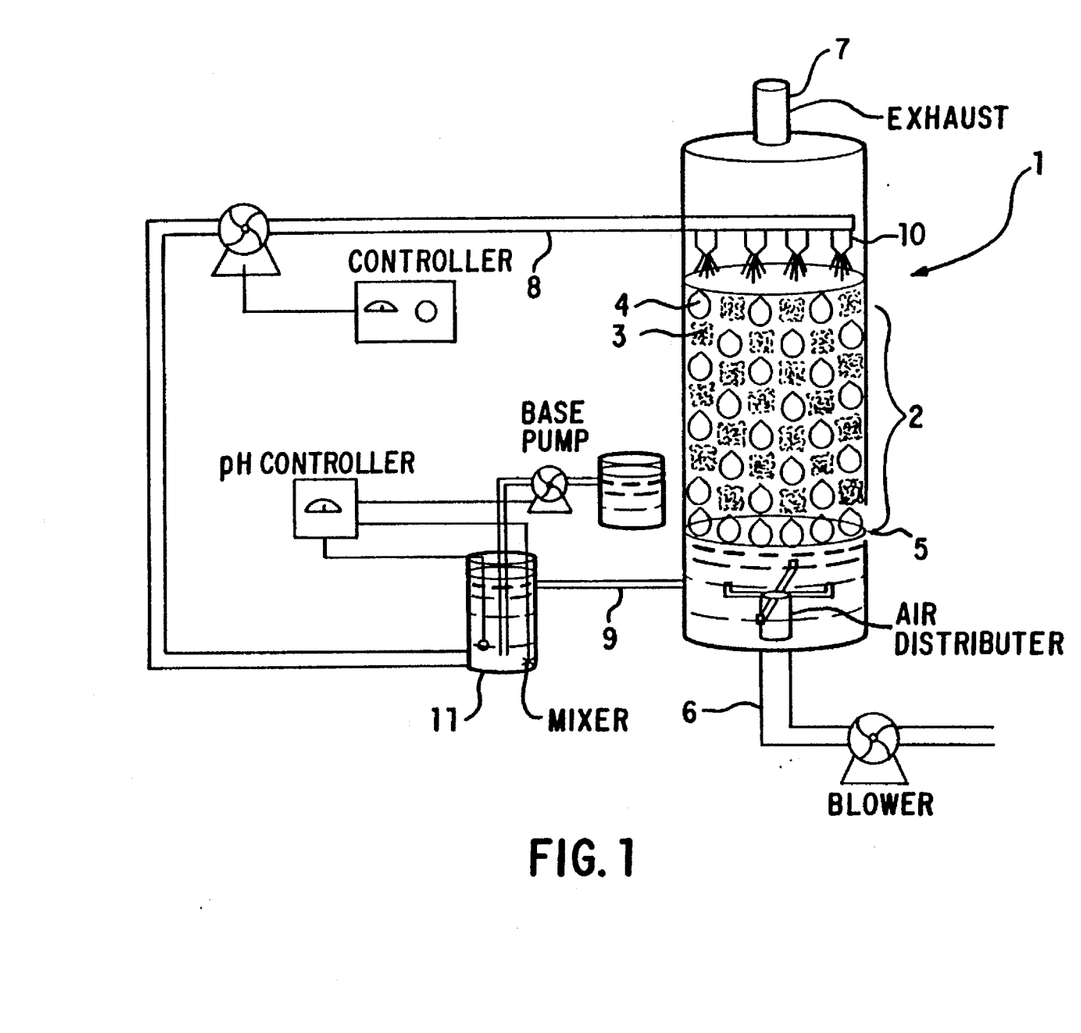
FIG. 1 is a cross-sectional side view of a vertical reactor for use in a preferred embodiment of the invention.

The present invention will be better understood by those skilled in the art by reference to FIG. 1, as an illustration. Referring to FIG. 1, the bioreactor 1 comprises a packed column 2, which comprises biologically active bodies 3 and, optionally, open space bodies 4. The biologically active bodies and the open space bodies are placed on top of a vented support layer 5, which may be a perforated plate fabricated from a metal or plastic. The bioreactor further comprises an inlet 6 and an outlet 7 for the gases. The inlet of the gases may be placed at the lower end of the bioreactor, as shown in FIG. 1, or at the top of the reactor, and the outlet of the gases should be placed at the other end of the bioreactor opposite to the inlet. During operation of the bioreactor, nutrients and water need to be provided. Nutrients, such as carbon and energy sources and minerals, may be added through use of known additives such as fish meal peptine, soybean flour, peanut oil, cotton seed oil, and usually salts capable of providing phosphate, sodium, potassium, ammonium, calcium, sulfate, chloride, bromide, nitrate, carbonate or like ions. Consequently, the bioreactor additionally comprises an inlet 8 and outlet 9 for an aqueous solution containing nutrients and buffers (feed mixture). The feed mixture is fed into the bioreactor at the top through sprayers 10, and allowed to flow down the column and accumulated at the bottom of the reactor. Alternatively, the feed mixture may be fed at different locations of the reactor by providing any inlet configurations that effectively and evenly distribute the feed mixture to the biologically active bodies. The accumulated feed mixture is withdrawn through a conduit or an outlet 9 to an external reservoir 11 in which the pH and the nutrient concentration of the collected feed mixture are analyzed. Based on the analyses of the mixture, a pH controlling agent, such as a solution of an acid or a base, and nutrients are added to the external reservoir. The re-conditioned feed mixture is then recycled to the top of the bioreactor. The feed mixture may be supplied to the bioreactor continuously or intermittently. The present bioreactor may also have additional water feeding mechanisms throughout the bioreactor using any effective feeding means known in the art.

If the present bioreactor is configured to feed the gas-streams into the bottom of the reactor, optionally, the inlet of the gas-stream may be placed below the level of the accumulated feed mixture, thereby the influent gases are saturated with water and a portion of water soluble pollutants contained in the influent gases are stripped before the gases come in contact with the biologically active bodies.

The present bioreactor can be adapted to remediate pollutants under both aerobic and anaerobic conditions. If aerobic microorganisms are employed to remediate pollutants, sufficient oxygen must be presented in the gases entering the reactor to prevent deprivation of oxygen. Oxygen can be conveniently supplemented in the form of pure oxygen or air through the influent gas-stream 6 or at any stage of the reactor column by providing additional inlets. For aerobic reaction conditions, preferably, the oxygen concentration of the fluid or moisture condensate existing around the microorganisms should be higher than 1 ppm (parts per million). If an anaerobic remediation is desired, the influent gases should not contain appreciable amount of oxygen or any known oxygen scavenger known in the art can be added to the gases and/or to the feed mixture.

The substrate of the present invention is formed from any organic or inorganic material that is decomposition-resistant and is capable of forming a solid body. The term decomposition-resistant as used herein indicates that the material does not substantially biodegrade within the normal service life of the substrate, which is at least about 5 years. Illustration of useful materials for fabrication of the substrate are thermoplastics such as polyamides, e.g., nylon 6, nylon 6/6, nylon 4/6, nylon 10, nylon 12 and the like; polyesters, e.g., poly(ethylene terephthalate), poly(butylene terephthalate), polycarbonate, and the like; polyacrylics, e.g., polyacrylic acid, poly(methylacrylic acid), poly(methyl acrylate), poly(methyl methacrylate), poly(ethyl methacrylate), polyacrylonitrile, polycarylamide, poly(methacrylamide) and the like; polyolefins, e.g., polyethylene, polypropylene, polybutylene and the like; elastomeric polymers, e.g., ethylene-propylene rubber, styrenic block copolymers, nitrile rubber and the like; polystyrene; polyvinyl chloride; polyvinyls, e.g., polyvinyl alcohol, poly(vinyl methyl ether), poly(vinyl methyl ketone), poly(vinyl pyrrolidone) and the like; as well as blends and copolymers thereof. Other useful polymeric materials for use in the fabrication of the polymeric substrate are polyurethanes such as those derived from reaction of diisocyanates such as toluene diisocyanates, diphenyl methane diisocyanates, hexamethylene 1,6-diisocyanate, dicyclohexylmethane diisocyanate, 1,5-naphthalene diisocyanate, p-phenylene diisocyanate, m-phenylene diisocyanate, 2,4-toluene diisocyanate, 4,4' diphenylmethane diisocyanate, 3,3'-dimethyl-4,4' diphenylmethane diisocyanate, 3,3'-dimethyl-4,4' biphenyl diisocyanate, 4,4'-diphenylisopropylidiene diisocyanate, 3,3'-dimethyl-4,4'-diphenyl diisocyanate, 3,3'-dimethyl-4,4'- diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyananodiphenylmethane and the like, and diols such as glycerin, trimethylopropane, 1,2,6-hexane triol, methyl glycoside pentaerythritol, sorbital sucrose, ethylene glycol, diethylene glycol, hydroxy terminated polyesters formed by direct esterification of dicarboxylic acid with an excess of a difunctional alcohol such as poly(tetramethylene adipate), poly(ethylene adipate), poly(1,4-butylene adipate), poly(1,5-pentylene adipate), poly(1,3 butylene adipate), poly(ethylene succinate), poly(2,3-butylene succinate), polyether diols such as those prepared by reaction of a compound having active hydrogens such as di alcohols, poly alcohols, di phenols, polyphenols, aliphatic diamines or polyamines and aromatic diamines or polyamines with alkylene oxides such as styrene oxide, butylene oxide, propylene oxide, epichlorohydrin or mixtures of these alkylene oxides, ethylene diamine, diethylene triamine and 4,4-phenyl-methane diamine.

In the preferred embodiments of this invention, the substrate is formed from open-celled polyurethanes, such as cross-linked polymeric materials which can be foamed with an appropriate foaming agent such as nitrogen, helium, carbon-dioxide, azodicarbonamide and the like, to form open celled foams.

In the particularly preferred embodiments of the invention, the substrate is formed from cross-linked polyurethanes. Such materials can be obtained from commercial sources or prepared in accordance with known techniques. For example, such materials may be obtained by reacting isocyanate prepolymers with water (in which diamines or polyamines are optionally contained as chain lengthening agents), or as cross-linking agents or by reacting a suitable polyol with a suitable diisocyanate or polycyanate reagent. Suitable polyols include long chain aliphatic diols and polyoxyalkylene ethers. The isocyanate prepolymers have isocyanate end-groups and are prepared by reacting poly oxyalkylene ethers with an excess of diisocyanate or polyisocyanates. Illustrative of useful polyoxyalkylene ethers are those which have a molecular weight of from about 500 to about 10,000, preferably from about 2,000 to about 8,000, which have at least two active hydrogens and which contain at least 30% by weight based on the total weight of the polyethers of oxyethylene groups. Other useful oxyalkylene groups include oxypropylene, oxybutylene and the like. Polyethers of this type are produced by reacting compounds which have reactive hydrogen atoms such as dialcohols, polyalcohols, diphenols, polyphenols, aliphatic diamines, aliphatic polyamines, aromatic diamines, or aromatic polyamines with a suitable alkylene oxide such as ethylene oxide, propylene oxide, butylene oxide, styrene oxide and the like. Suitable diisocyanates include toluene 4,4'-diisocyanate, toluene 2,4-diisocyanate, toluene 2,2-diisocyanate, diphenylmethane 4,4'-diisocyanate, diphenylmethane 2,4'-diisocyanate, diphenylmethane 2,2'-diisocyanate, toluene 2,6-diisocyanate, hexamethylene 1,6- diisocyanate and useful diamines and polyamines include aliphatic, cycloaliphatic and aromatic di- and polyamines such as ethylene diamine, hexamethylene diamine, diethylene triamine, hydrazine, guanidine, carbonate, N,N'-diisopropylhexamethylene diamine, 1,3-bisaminomethylbenzene, N,N'-bis-(2-aminopropyl)- ethylene diamine, N,N'-(2-aminoethyl) ethylene diamine, 4,4'-diaminodiphenyl methane, 4,4'-dimethylamino-3,3'-dimethyldiphenyl methane, 2,4'-diamino-diphenylmethane, 2,4-diaminotoluene, 2,6-diaminotoluene and the like.

The substrate of the present invention may be fabricated into different shapes, including spheres, cubes, rectangles, cylinders, irregular shaped objects and the like, to accommodate different needs of different bioreactor configurations and applications. The size of the substrate may vary widely in longitudinal dimension of length and traverse dimensions of thickness, width and diameter. Preferred sizes of the substrate range from about 0.3 cm to about 30 cm. More preferred sizes are from about 1 cm to about 15 cm, and most preferred sizes are from about 2 cm to about 8 cm.

In the preferred embodiments of the present invention, the substrate is a porous substrate that has interconnected throughpores, and preferably, the throughpores are macropores. The term macropore as used herein indicates an average pore diameter of equal to or larger than about 0.1 cm, preferably equal to or larger than about 0.15 cm, and more preferably equal to or larger than about 0.2 cm. The throughpores within the substrate not only increase the surface area of the substrate where microorganisms can attach and grow, thereby increasing the biomass density within the bioreactor, but also provide additional pathways for the influent gases to travel, thereby reducing the pressure drop between the inlet and outlet of the bioreactor. The macropores also provide pathways for the feed mixture to travel to the microorganisms. In addition, the macropores of the substrate lessen the likelihood of the throughpores from being clogged as the biomass density within the substrate increases.

The throughpores of the substrates preferably creates from about 40 volume % to about 98 volume % of voids within the substrates, more preferably from about 60 volume % to about 96 volume %, and most preferably from about 85 volume % to about 95 volume %.

The bioreactor of the present invention may further comprise open space bodies that are inter-dispersed among the biologically active bodies. The bioreactor may comprise from about 10 to 90 volume % of biologically active bodies and from about 90 to about 10 volume % of open space bodies. While it is not wished to be bound by any theory, it is believed that inter-dispersing the biologically active bodies and the open space bodies allows the open space bodies to act as redistributors that are interdispersed throughout the reactor, which promote efficient delivery of the feed mixture and oxygen to the biologically active bodies, and efficient removal of metabolic products from the biologically active bodies, especially when the biomass density in the bioreactor reaches a level in which the biomass blocks some of the pores of the substrates. In addition, the open space bodies ensure that all or substantially all of the internal and external surfaces of the biologically active bodies are accessible to the influent gases by interrupting the compaction of the biologically active bodies in accordance with their geometrical shapes.

The open space bodies are comprised basically of a rigid outer-framework which skeletally defines the open structure having a plurality of passages thereto. The size and shape of the open space bodies are not critical, and can vary widely in longitudinal dimension of length and traverse dimensions of thickness, width and diameter. However, the size of the outer-framework of the bodies must not be large enough to allow the biologically active bodies to move into the open region of the open space bodies. Preferred sizes of the open space bodies range from about 0.3 cm to about 30 cm. More preferred sizes are from about 1 cm to about 15 cm, and most preferred sizes are from about 2 cm to about 8 cm.

The composition of the open space bodies may vary widely. The only requirement is that the material is suitable for use as a substrate in a bioreactor, and is suitable for use in microbial processes. For example, the bodies may be formed from organic materials or inorganic materials. Illustrative of useful inorganic materials for fabrication of the open space bodies are ceramics such as bentonite, kaolinite, kieselguhr, diatomaceous earth, aluminum, silica, zirconia, barium titanate, synthetic carbides, synthetic nitrides and synthetic borides, glasses such as soda-lime-silica glasses, lead glasses, borosilicate glasses, laser glasses, silica glasses, and glass-ceramics and the like. Suitable organic materials for fabrication of the open space bodies are polymers such as polyamides, polyesters, polyester carbonates, polycarbonates, polyolefins and the like. Preferably, the open space bodies are molded of a rigid plastic such as polypropylene or polyethylene.

In the preferred embodiments of the present invention, the substrates or the substrates and the open space bodies are coated with an absorbent for at least one of the pollutants contained in the influent gases. Preferably, the entire internal surface, i.e., the surface of the throughpores, and the external surface of the substrate are coated with an absorbent. Illustrative of useful absorbents are carbons such as coal, charcoal, carbon black, activated carbon, and activated charcoal; silica gel; active clays; zeolites; hydrophobic and ion exchange resins, molecular sieves and the like. Of these, the preferred are coal, charcoal, carbon black and activated carbon. Suitable absorbents are in particulate form and preferably is porous to provide for greater surface area. Although any size or shape of particulate absorbents may be utilized, preferably, suitable absorbents are of a size such that at least 70% of the absorbent particles are smaller than 44 microns to provide high surface area. In addition, suitable absorbents, preferably, have an average particle size of at least 25 microns since grinding the absorbents to obtain a finer particle size significantly increases the cost of the abosorbents.

The substrates and the open space bodies are coated with the absorbent by conventional impregnation techniques, such as immersion of the substrate and the body in a suspension of the absorbents in water or an organic solvent. The coating suspension further comprises a binder, a suspension aid, and a viscosity enhancer.

There is a tendency for binders to decrease the efficiency of an absorbent by diminishing the abosorbent's capacity or by interfering with a pollutant's access to the absorbent, e.g., binder envelops the absorbent. Consequently, suitable binders should only minimally, if at all, interfere with the absorbing property of the absorbents. It has been found that binders having a low Tg (glass transition temperature) function as more effective binders. In preferred embodiments of this invention, an effective binder has a Tg of less than or equal to about 100° C. In more preferred embodiments, the effective binder has a Tg less than equal to about 50° C.; in most preferred embodiments, equal to less than about 25° C. Examples of suitable binders include cellulose esters, cellulose ethers, polymers and copolymers of vinyl esters such as vinyl, acetate, acrylic acid esters, and methacrylic acid esters; vinyl monomers such as such as styrene, acrylonitrile and acrylamide; dienes such as butadiene and chloroprene; natural rubber; and synthetic rubber such as styrene-butadiene. More detailed discussion of suitable binders is disclosed in copending patent application Ser. No. 07/763,735, filed Sep. 23, 1991.

The absorbent suspension of this invention contains a suspension aid to provide a uniformly dispersed suspension. Although any suspension aid or surfactant known in the art may be utilized, it has been found that preferred suspension aids are di-anionic, polyanionic, and net neutral or net negative zwitterionic dispersants, and that preferred suspension aids derive their anionic charges from functionalities selected from the group consisting of sulfonate, sulfate, sulfite, phosphate, phosphite, phosphonate, carboxylate and combinations thereof. In other preferred embodiments, polyanionic polypeptides, such as sodium caseinate are preferred. Illustrative of suitable suspension aids are ammonium caseinate, fatty acid salts, e.g., fatty acid sulfonates, alpha-olefin sulfonates, naphthalene sulfonates, biphenyl sulfonates, alcohol sulfonates, or phosphate counterparts to the above sulfonates. The present absorbent suspension further comprises a viscosity enhancer or settlement retardant in order to prevent rapid settlement of the absorbent in the suspension. Illustrative of suitable viscosity enhancers are carrageenan, locust bean gum, agar, alginin, pectin, gums, e.g., guar gum, locust bean gum, xanthan gum, and cellulosic thickeners, e.g., carboxymethylcellulose and carboxy 2-hydroxyethyl cellulose. More detailed discussion of suitable suspension aids and viscosity enhancers is disclosed in copending patent application Ser. No. 07/878,105, filed May 4, 1992.

The microorganisms used in the practice of this invention are anaerobic or aerobic microorganisms selected to degrade target pollutants in the gaseous or vaporous streams in ways well known in the art. The microorganisms can be employed as a pure strain or as a consortium of microorganisms. Although anaerobic microorganisms often degrade pollutants at a slower rate than aerobic microorganisms, an anaerobic process may be required to degrade a pollutant or an intermediate product of an aerobic process to an nontoxic level or to a non-pollutant material. Useful microorganisms may vary widely and may be naturally occurring microorganisms or may be genetically engineered microorganisms. The only requirement is that the microorganisms are capable of metabolizing the target pollutant(s) to the required effluent levels over the required period of time. In the preferred embodiments of the invention, the microorganism are obtained from the pollutant-containing waste stream or from soil which has been in contact with the waste stream.

The vaporous pollutants that can be remediated with the present bioreactor may also vary widely. The only requirement is that at least one of the materials can be degraded or metabolized by an aerobic or anaerobic microorganism. The materials may be organic or inorganic. Illustrative of such organic pollutants are phenolic materials such as phenol, the cresols, resorcinols, catechol, halogenated phenols as for example, 2-chlorophenol, 3-chlorophenol, 4-chlorophenol, 2,4-dichlorophenol, pentachlorophenol, nitrophenols as 2-nitrophenol and 4-nitrophenol and 2,4-dimethylphenol. Another important class of organic pollutants consists of aromatic hydrocarbons, such as benzene, toluene, xylenes, ethylbenzene, and so forth. Polynuclear aromatic hydrocarbons are an important subclass as represented by naphthalene, anthracene, chrysene, acenaphthylene, acenaphthene, phenanthrene, fluorene, fluoranthene, naphthalene, and pyrene. Still other materials are halogenated alkanes such as trichloroethane and the like.

In the preferred embodiments of this invention the materials are vapors of those which are common in waste streams from industrial manufacturing facilities, including petroleum distillation facilities. For example, various substituted and unsubstituted phenols such as phenol, chlorophenols and nitro-phenols, and aromatics such as benzene are preferred pollutants for treatment in the process of this invention, and substituted and unsubstituted phenols, especially phenol, are the most preferred pollutants. Phenol is found in waste streams of phenol manufacturers, of phenol users as phenol resin producers, of coal tar processing facilities, of wood pulping plants and other facilities practicing delignification. This is not to say that the process can or must be practiced only with such streams. The process which is the invention herein may be practiced on any feed containing levels of one or more materials which are to be reduced.

The initial concentration of materials contained in the vaporous or gaseous stream used in the process of this invention may vary widely. One of the advantages of this invention relative to prior art bioremediation processes is that vaporous streams containing relatively high amounts of materials to be removed or reduced in concentration can be treated. In addition, the absorbent particles coated on the substrate of the present invention act as a buffer for intermittent inflows of high concentration of pollutants that may be high enough to inactivate the pollutant-remediating microorganisms. The absorbents quickly absorb the incoming pollutants and release them slowly such that the microorganisms are not rendered inactivated by the intermittent inflow of a high pollutant concentration and the microorganisms have a relatively constant supply of pollutants to metabolize. Through this absorption and desorption process, the absorbents on the substrates are regenerated and have a long service life.

The present vapor remediation bioreactor, unlike prior art bioreactors employing decomposable substrates, provides a long service life and an improved remediation-efficiency, as well as stable performances regardless of the age of substrate and the fluctuating pollutant concentration in the inflow. The present biologically active bodies are not fabricated from a decomposable material and, thus, are dimensionally stable. Therefore, the pollutant-remediating bodies in the present bioreactor do not change their configuration during operation of the reactor, and consequently, the flow pattern of the gases to be remediated in the bioreactor does not change with time, resulting in consistent and stable remediation result.

The following examples are presented to more particularly illustrate the invention and are not to be construed as limitations thereon.

EXAMPLES

EXAMPLE 1

This example is an illustration of the preparation for a suitable absorbent-coating composition.

A 2.5% ammonium caseinate solution was prepared by adding 1 ml of 20% ammonium hydroxide into 200 ml of distilled water and then adding 5 g of casein, which is available from National Casein Co., Chicago, Ill., while stirring rapidly to dissolve the casein particles completely. Into 491 ml of distilled water, 100 ml of the ammonium caseinate solution was added and stirred at about 90 rpm for 20 minutes. To the resulting diluted ammonium caseinate solution, 177 g of powdered activated carbon (PAC), type C, which is available from Calgon Corp, while agitating at 260 rpm. The speed of agitation was decreased to about 80 rpm and the slurry was stirred for about 3½ hour to remove gas bubbles. The agitation speed was then increased to about 260 rpm and rapidly 233 ml of a carboxylated acrylate latex adhesive, Synthemul 40404, which is available from Reichold Corp was added. The mixture was continuously stirred for an additional 30 minutes and then very slowly 2.5 g of carboxymethyl cellulose, high viscosity grade C5013, which is available from Sigma Chemical, was added. The resulting mixture was continuously stirred for another 1.5 hours, and then the agitation speed was reduced to about 40 rpm and stirred overnight to completely dissolve the carboxymethyl cellulose.

EXAMPLE 2

This example is an illustration of a suitable coating process.

A stiff reticulated polyether foam, SIF-2 ZS15D, which is available from Foamex, Inc., PA, having a nominal pore distribution of 15±5 pores per inch, was cut into cubes of 0.5×0.5×0.5 inches. The cubes were immersed in the slurry prepared in Example I, and squeezed 4 to 5 times to remove entrapped air. The cubes were recovered from the slurry and passed through a pair of rollers having a 1.02 mm gap to remove excess slurry. The cubes were than air dried for 3 days. The resulting cubes had approximately 0.55 lbs of PAC when normalized to a cubic foot.

EXAMPLE 3

This example demonstrates the superior property of the present substrate coated with an absorbent, PAC.

Wild-type microorganisms that can metabolize a mixture of benzene, toluene, ethylbenzene and xylene were isolated from a soil sample by the following procedure. 0.5 g of soil from an abandoned drum yard was placed into 50 ml of a nutrient medium having the following composition: 0.40 g/l of $(NH_4)_2SO_4$, 0.14 g/l of $KH_2PO_4$, 0.18 g/l of $K_2HPO_4$, 0.20 g/l of $MgSO_4 \cdot 7H_2O$, 0.10 g/l of $CaCl_2$, 0.01 g/l of disodium EDTA, 0.05 g/l of yeast extract and 0.1 ml of trace metals prepared in accordance with the procedure outline in *J. Gen. Microbiology*, Brandis et al., 126, 249–252 (1981). To the nutrient containing the soil sample, 10 μl of BTEX (7.9 vol % benzene, 60.5 vol % toluene, 15.8 vol % ethylbenzene, 14.2 vol % m-xylene and p-xylene mixture, and 1.6 vol % o-xylene) were added three times a day for one week. 2 ml of this culture was then transferred to a flask containing 50 ml of the same nutrient medium and the same proportion of BTEX. In 2 weeks thereafter, the cell density of the culture reached an adequate level, which was defined to be $A_{600}$ of about 0.74 when measured in a 1 cm path length cuvette using a Varian DMS 200 UV/VIS spectrometer. The culture was again transferred to 2 liter of the nutrient medium containing the same proportion of BTEX. Within 3–5 days the cell density reached the above-defined adequate level.

Four glass columns having an inside diameter of 6.6 cm and a height of 71 cm (volume of each being about 2.7 liter) were packed as follows. Column 1 was packed with, in 1:1 volume ratio, 0.5×0.5×0.5 inch cubes of uncoated polyether foam and 1 inch diameter rigid spherical open space bodies, which is available from Jaeger Products, Inc., under a trade designation of Tripack; column 2 was packed with, in 1:1 volume ratio, 0.5×0.5×0.5 inch cubes of coated polyether foam as prepared in Example 2 and 1 inch Tripack; column 3 was packed with 0.5×0.5×0.5 inch cubes of uncoated polyether foam; and column 4 was packed with 0.5×0.5×0.5 inch cubes of coated polyether foam as prepared in Example 2.

The columns were fitted into a reactor configuration similar to that shown in FIG. 1. The top of the column was fitted with a rubber stopper equipped with an outlet for the gas and an inlet for the nutrient. A glass frit was place at the bottom of the column to function both as a holder for the substrates and a sprager. A side arm was inserted through the wall of the column as an outlet for the accumulated nutrient at a level about 3.5 cm above the frit. The fluid exiting the side arm was collected into a 500 ml flask and recirculated to the top of the column after its pH was adjusted with 2 N NaOH. The flow rate of the nutrient was about 12 ml per minute. Air containing the pollutants was fed through a tube placed below the frit, and passed through the accumulated aqueous nutrient in the form of small bubbles. The air then flowed through the packed bed of substrates containing the biomass. The test specimen air flow rate was about 50 ml/min and it contained 12.3 mg of BTEX per liter of air, which is essentially an overload concentration for an unacclimated reactor.

Equal volume of the 2 liter culture was added to each column and the excess was drained out in order to inoculate the substrates in the columns. The inoculated reactor was then ran for about 300 hours and the effluent air-streams were analyzed for their BTEX contents. The results are shown in FIG. 2–6.

Figure 2:
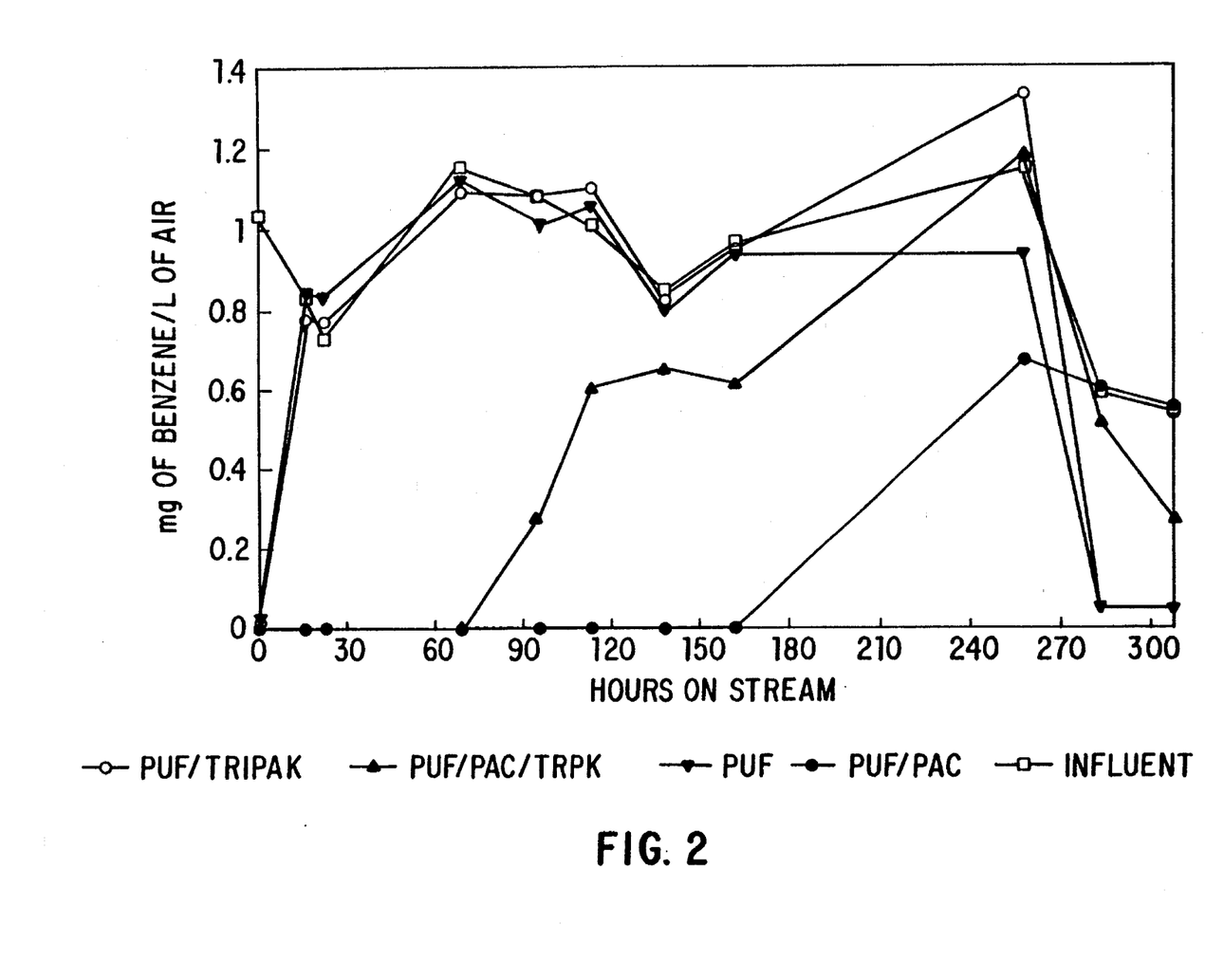
FIG. 2 is a graphic presentation of the benzen content of the effluent air stream for Example 3.

FIG. 2, which is a graphic presentation of the benzene content of the effluent air of the experiment, demonstrates that columns 1 and 4, which contained the PAC coated substrates, initially absorbed benzene rapidly until the PAC was saturated. Once the PAC was saturated, the performance of the columns deteriorated before they regained their remediation efficiency. It is believed that this phenomenon was due to the low initial biomass density in the bioreactor and the removal of benzene from the influent air by the PAC, depriving the carbon sources and resulting in the slowed growth of the microorganisms that metabolize benzene. Once the PAC was saturated and benzene became available, the microorganisms started to accumulate and thus started to remediate benzene at a greater rate. The uncoated substrates in columns 2 and 3 did not reduce the benzene content until about 270 hours into the experiment, indicating that until that point, the bioreactor did not have a sufficient biomass density to significantly reduce the benzene content of the influent air.

Figure 3:
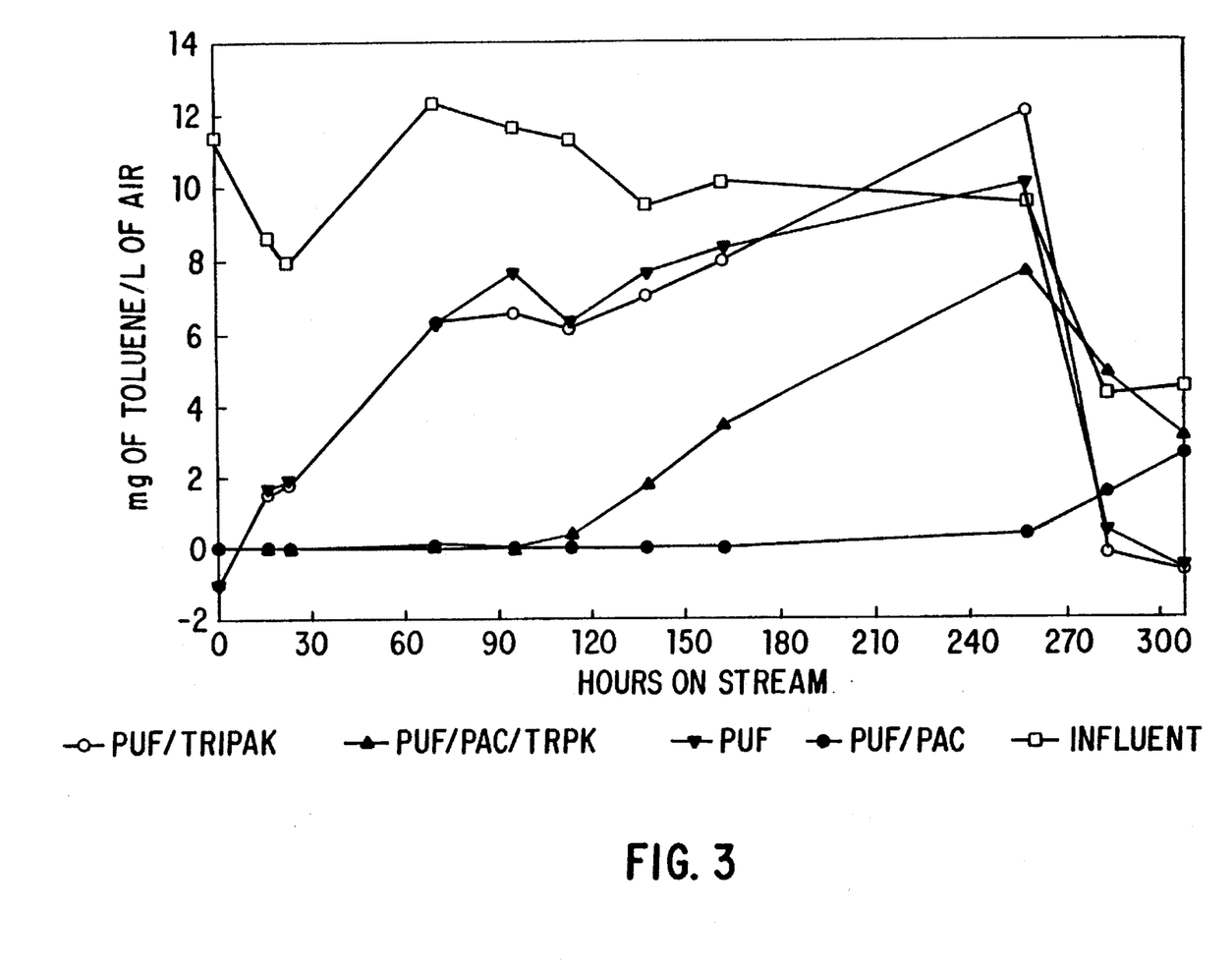
FIG. 3 is a graphic presentation of the toluene content of the effluent air stream for Example 3.
Figure 4:
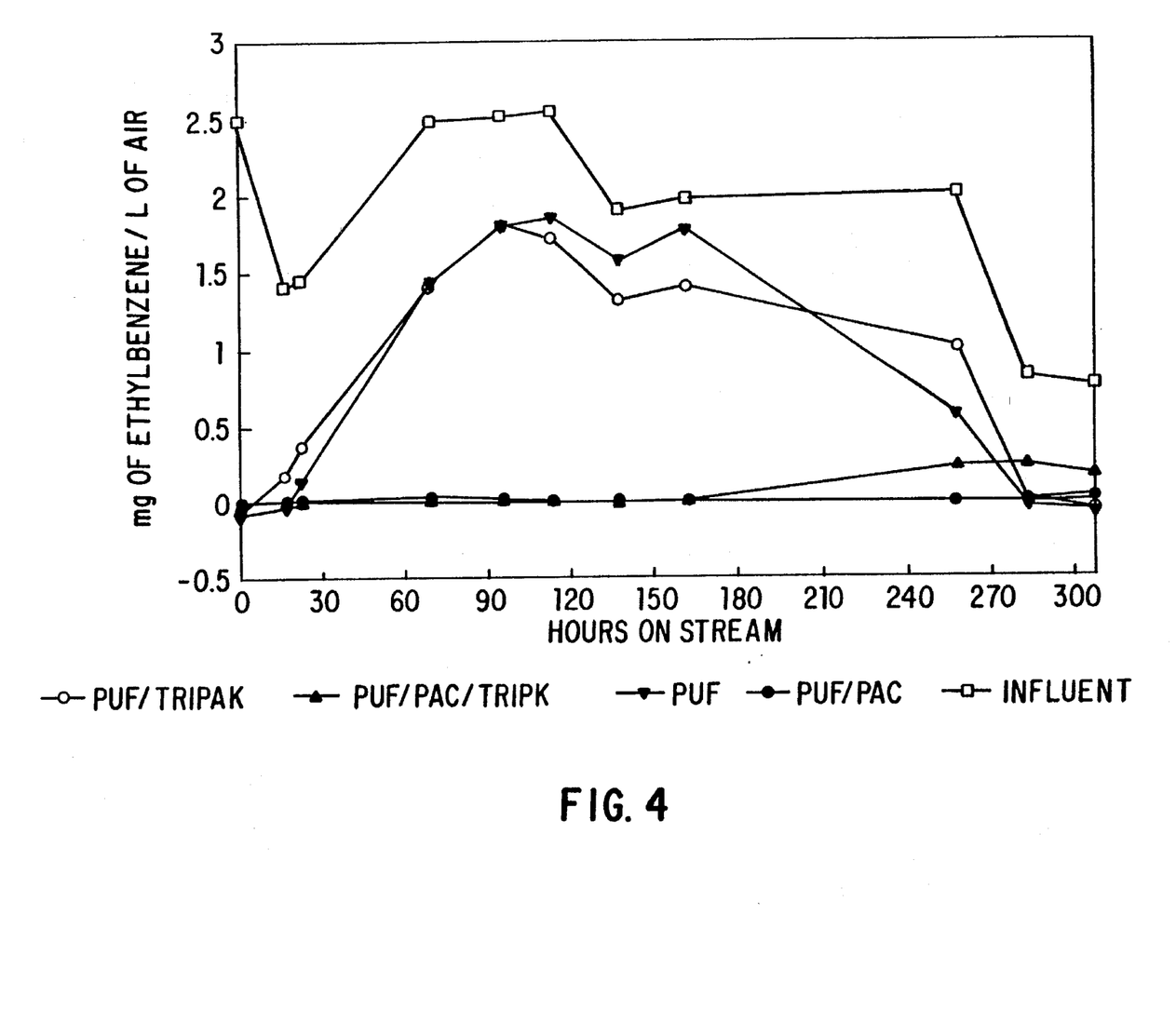
FIG. 4 is a graphic presentation of the ethylbenzene content of the effluent air stream for Example 3.
Figure 5:
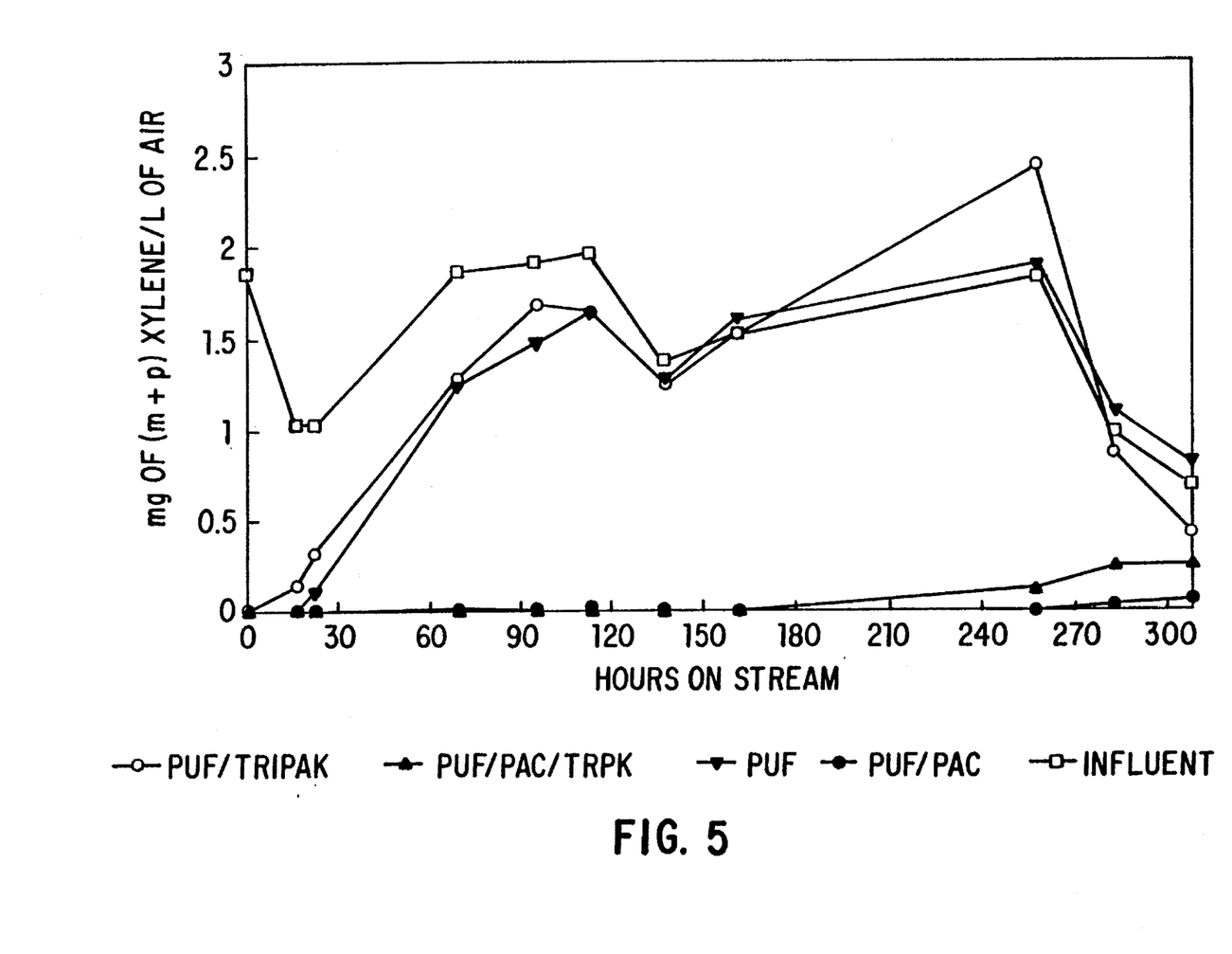
FIG. 5 is a graphic presentation of the m- and p-xylene contents of the effluent air stream for Example 3.
Figure 6:
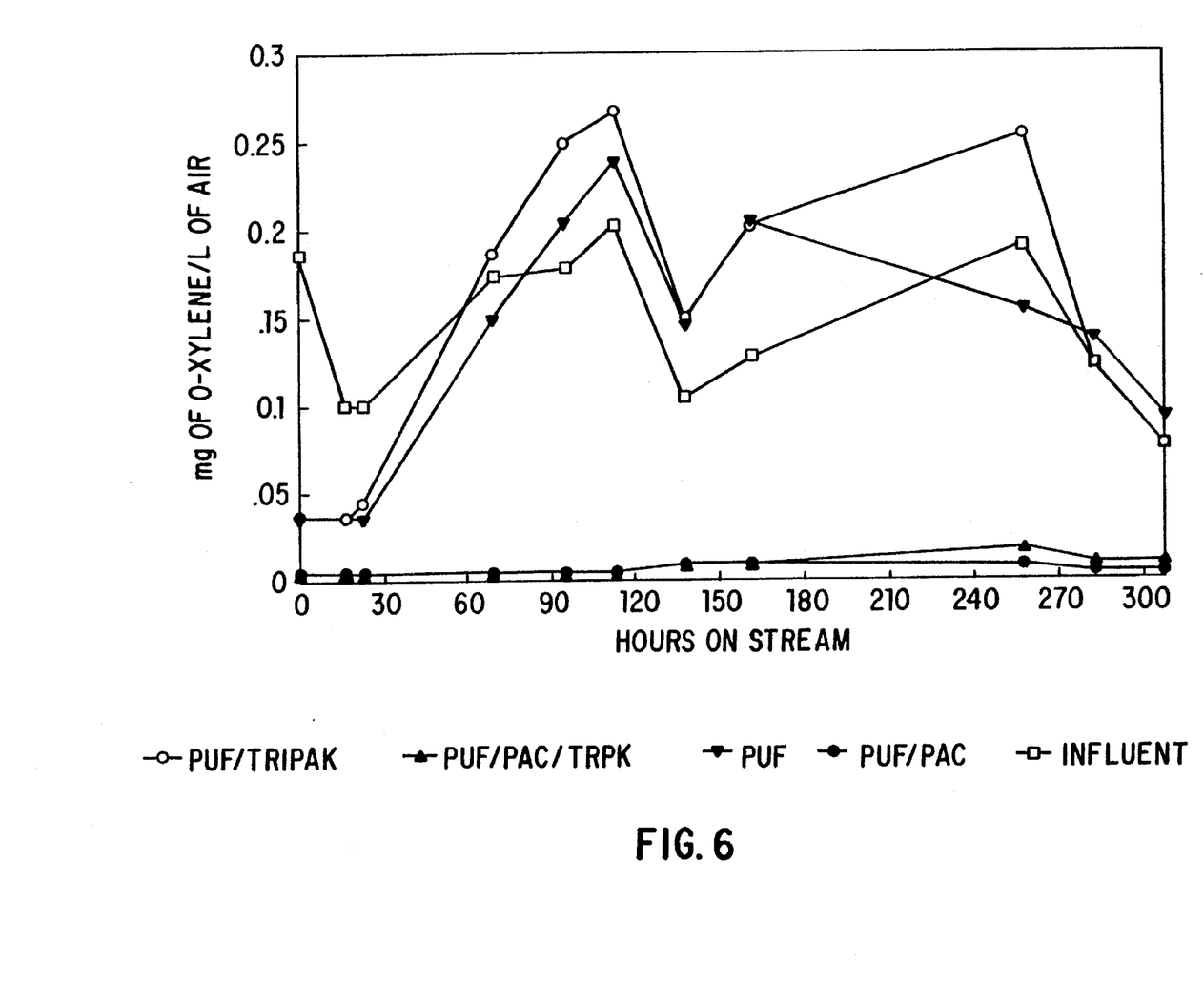
FIG. 6 is a graphic presentation of the o-xylene content of the effluent air stream for Example 3.

FIG. 3, which is a graphic presentation of the toluene content of the effluent air of the columns, and FIG. 4, which presents ethylbenzene content, demonstrate similar results as discussed above for benzene. FIG. 5, which presents m- and p-xylene content, and FIG. 6, which presents o-xylene content, demonstrate that the microorganism densities for the two test-specimen pollutant-remediating microorganisms did not increase high enough to significantly reduce the pollutants in 300 hours.

EXAMPLE 4

Example 3 is continued for a longer time period to observe the performance of the reactors when the bioreactors reach steady state.

Under the steady state condition, i.e., when the bioreactors accumulate an effectively high biomass density, the performance of column 2 is superior to that of column 1, the performance of column 1 is better than that of column 4, and the performance of column 4 is better than that of column 3. It can be seen that the open space bodies and the PAC coating improve the performance of the bioreactors. In addition, when transient spike loads of pollutants are introduced into the influent air, the reactors with carbon coated substrates perform more evenly and superiorly than the reactors with uncoated substrates.

What is claimed is:

1. An apparatus for purification of a gaseous stream comprising one or more pollutants by biodegradation with one or more microorganisms capable of metabolizing one or more of said pollutants, said apparatus comprising:

1) a reactor having an inlet for inflow of said gaseous stream on one side of a fixed bed comprising a plurality of biologically active bodies which comprise macroporous substrates and one or more of microorganisms capable of remediating one or more of said pollutants, 2) an outlet disposed on the opposite side of said fixed-bed for outflow of an effluent gas-stream in which the concentration of at least one of said pollutants is less than the concentration of said gaseous stream at the inlet, and 3) a means to supply a liquid solution of nutrients and buffers to said fixed-bed of biologically active bodies, wherein said macroporous substrates are fabricated from a decomposition-resistant material and wherein said substrates are coated with a composition comprising an absorbent, a binder, a suspension aid, and a viscosity enhancer.

2. The apparatus of claim 1 wherein said reactor further comprises a plurality of open space bodies.

3. The apparatus of claim 2 wherein said open space bodies are coated with an adsorbent.

4. The apparatus of claim 1 wherein said reactor further comprises a feeding means that supplies a solution of nutrients and buffers.

5. The apparatus of claim 1 wherein said macroporous substrates comprise pores having an average pore size of equal to or greater than about 0.1 cm.

6. The apparatus of claim 1 wherein said macroporous substrates comprise from about 40 volume % to about 98 volume % of throughpores.

7. The apparatus of claim 1 wherein said macroporous substrates are fabricated from a thermoplastic or a polyurethane.

8. The apparatus of claim 7 wherein said macroporous substrates are fabricated from polyurethane.

9. The apparatus of claim 1 wherein said macroporous substrates are coated with an absorbent selected from the group consisting of coal, charcoal, carbon black, activated carbon, activated charcoal, silica gel, active clays, zeolites, ion exchange resins and molecular sieves.

* * * * *